(12) United States Patent
Iurisci et al.

(10) Patent No.: US 10,927,756 B2
(45) Date of Patent: Feb. 23, 2021

(54) MULTI-STAGE RADIAL TURBOEXPANDER

(71) Applicant: NUOVO PIGNONE TECNOLOGIE SRL, Florence (IT)

(72) Inventors: Giuseppe Iurisci, Florence (IT); Paola Di Festa, Florence (IT); Francesco Cangioli, Florence (IT); Davide Biliotti, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 148 days.

(21) Appl. No.: 16/254,820

(22) Filed: Jan. 23, 2019

(65) Prior Publication Data

US 2019/0234301 A1 Aug. 1, 2019

(30) Foreign Application Priority Data

Jan. 26, 2018 (IT) .......................... 102018000002047

(51) Int. Cl.
*F02C 1/02* (2006.01)
*F01D 1/08* (2006.01)
(Continued)

(52) U.S. Cl.
CPC ............... *F02C 1/02* (2013.01); *F01D 1/08* (2013.01); *F01D 5/02* (2013.01); *F01D 5/04* (2013.01);
(Continued)

(58) Field of Classification Search
CPC ...... F02C 1/02; F02C 6/16; F02C 7/32; F01D 5/04; F01D 5/043; F01D 5/02; F01D 13/003; F01D 15/06; F01D 15/12; F01D 1/08; F05D 2260/211; F05D 2220/62; Y02E 60/16
(Continued)

(56) References Cited

U.S. PATENT DOCUMENTS 2,797,858 A * 7/1957 Von Der Nuell ......... F01D 1/08
                                                    415/148
5,537,822 A * 7/1996 Shnaid ...................... F02C 6/04
                                                     60/650

(Continued)

FOREIGN PATENT DOCUMENTS

DE       4410440 A1   8/1995
DE   102011007753 A1  10/2012

OTHER PUBLICATIONS

Buffa, et al., "Exergy and Exergoeconomic Model of a Ground-Based CAES Plant for Peak-Load Energy Produciton", Energies 2013, 6, pp. 1050-1067, DOI:10.3390/en6021050; ISSN 1996-1073, available from www.mdpi.com/journals/energies.

(Continued)

*Primary Examiner* — J. Todd Newton
(74) *Attorney, Agent, or Firm* — Baker Hughes Patent Org.

(57) ABSTRACT

A multi-stage turboexpander and a method for generating mechanical power therewith are disclosed. The multi-stage turboexpander includes a casing and a shaft, arranged for rotation in the casing. The shaft is supported by a first bearing at a first shaft end portion and a second bearing at a second shaft end portion. A first radial impeller and a second radial impeller are arranged between the first bearing and the second bearing on the shaft for co-rotation therewith around a rotation axis.

11 Claims, 3 Drawing Sheets

(51) Int. Cl.
*F01D 5/04* (2006.01)
*F02C 6/16* (2006.01)
*F01D 5/02* (2006.01)
*F01D 13/00* (2006.01)
*F01D 15/06* (2006.01)
*F01D 15/12* (2006.01)
*F02C 7/32* (2006.01)

(52) U.S. Cl.
CPC ........... *F01D 5/043* (2013.01); *F01D 13/003* (2013.01); *F01D 15/06* (2013.01); *F01D 15/12* (2013.01); *F02C 6/16* (2013.01); *F02C 7/32* (2013.01); *F05D 2220/62* (2013.01); *F05D 2260/211* (2013.01)

(58) Field of Classification Search
USPC ........................................................ 416/199
See application file for complete search history.

(56) References Cited

U.S. PATENT DOCUMENTS

| | | | |
|---|---|---|---|
| 2012/0107108 A1 | 5/2012 | Hideki et al. | |
| 2014/0126994 A1* | 5/2014 | Ishikawa | F01D 1/06 415/68 |
| 2015/0167496 A1* | 6/2015 | Alexander | F01D 9/04 415/182.1 |
| 2018/0283198 A1* | 10/2018 | Shin | F01D 17/146 |
| 2019/0234301 A1* | 8/2019 | Iurisci | F02C 7/32 |

OTHER PUBLICATIONS

IT Search Report and Written Opinion issued in connection with corresponding Application No. IT 102018000002047 dated Sep. 11, 2018.

* cited by examiner

US 10,927,756 B2

MULTI-STAGE RADIAL TURBOEXPANDER

TECHNICAL FIELD

The present disclosure relates to turbomachines. More specifically, embodiments disclosed herein concern turboexpanders, and in particular multi-stage turboexpanders.

BACKGROUND OF THE INVENTION

Turbomachines are devices where mechanical energy in the form of a shaft work is transferred either to or from a continuously flowing fluid by the dynamic action of rotating blades. Turboexpanders are turbomachines wherein a pressurized compressible working fluid is expanded while flowing in flow channels defined between blades of a rotor. The expansion of the working fluid causes enthalpy of the expanding working fluid to be converted into mechanical power, available on the shaft of the turboexpander.

Turboexpanders are often used in several industrial systems and plants, where a flow of pressurized and possibly hot working fluid is available and can be used to extract power there-from by conversion of enthalpy of the working fluid into mechanical power.

Turboexpanders can be classified in axial turboexpanders, where the flow of working fluid is substantially parallel to the axis of the rotor, and radial turboexpanders, where the flow of working fluid is substantially radial in at least part of the working fluid path through the turboexpander. The fluid usually flows in a centripetal direction, i.e. it enters the impeller at a first radial position and exits the impeller at a second radial position which is nearer than the first radial position to the rotation axis of the impeller.

Some known turboexpanders are provided with an integrated with a gear transmission. A central toothed wheel meshes with a plurality of pinions. Each pinion is mounted on a respective shaft for co-rotation therewith. The shaft supports one or two overhung impellers. Each impeller is housed in a respective housing and forms therewith one of the turboexpander stages.

Integrally geared turboexpanders are used for instance in so-called CAES (Compressed Air Energy Storage) systems. Examples of integrally geared turboexpanders are disclosed in F. Buffa, Simon Kemble, G. Manfrida, A. Milazzo: "*Energy and Exergoeconomic Model of a Ground-Based CAES Plant for Peak-Load Energy Production*", Energies 2013, 6, 1050-1067, DOI: 10.3390/en6021050; IS SN 1996-1073, available from www.mdpi.com/journals/energies.

The gear train formed by the central toothed wheel and peripheral pinions meshing therewith is complex and cumbersome, and increases the footprint of the turboexpander. Gears adversely affect the overall efficiency of the turboexpander, since part of the mechanical power generated by expansion is dissipated by mechanical friction in the gear train.

Gaseous working fluid expands sequentially through impellers mounted on different shafts, such that power generated by each impeller is transferred to the central toothed wheel, which in turn can be drivingly coupled to a load, for instance through a central shaft, on which the central toothed wheel is integrally mounted. Each impeller must be fluidly coupled to a subsequent or preceding impeller through a pipe. A complex piping system is thus required for the gaseous working fluid to flow through the plurality of turboexpander stages. This adds to the complexity of the turboexpander.

A more compact and less complicated turboexpander would thus be welcomed in the technology.

SUMMARY OF THE INVENTION

Embodiments of the disclosure may provide a multi-stage turboexpander, comprising a casing and a shaft arranged for rotation in the casing. The shaft can be supported for rotation in the casing by a first bearing at a first shaft end and a second bearing at a second shaft end. Each bearing may in turn include one or more bearing components, for instance a radial bearing component and an axial or thrust bearing component in combination. A first radial impeller and a second radial impeller are arranged on the shaft for rotating integrally therewith around a rotation axis. The first impeller and the second impeller are arranged between the first bearing and the second bearing in a so-called between-bearing arrangement.

Use of more than two impellers on the same shaft is not excluded.

According to a further aspect, disclosed herein is a method of generating mechanical power by expanding a working fluid, comprising the following steps, which may be performed in any suitable order or combination unless expressly specified otherwise herein: delivering a flow of compressed working fluid to a first radial impeller mounted on a shaft supported for rotation in a casing by a first bearing and a second bearing, the first radial impeller being mounted between the first bearing and the second bearing;

partly expanding the flow of compressed working fluid in the first radial impeller and generating mechanical power therewith, said mechanical power being available on the shaft;

discharging a flow of partly expanded working fluid from the casing;

delivering the flow of partly expanded working fluid to a second radial impeller mounted on the shaft between the first bearing and the second bearing; and further expanding the flow of partly expanded working fluid in the second radial impeller and generating mechanical power therewith, said mechanical power being available on the shaft.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

Figure 1:
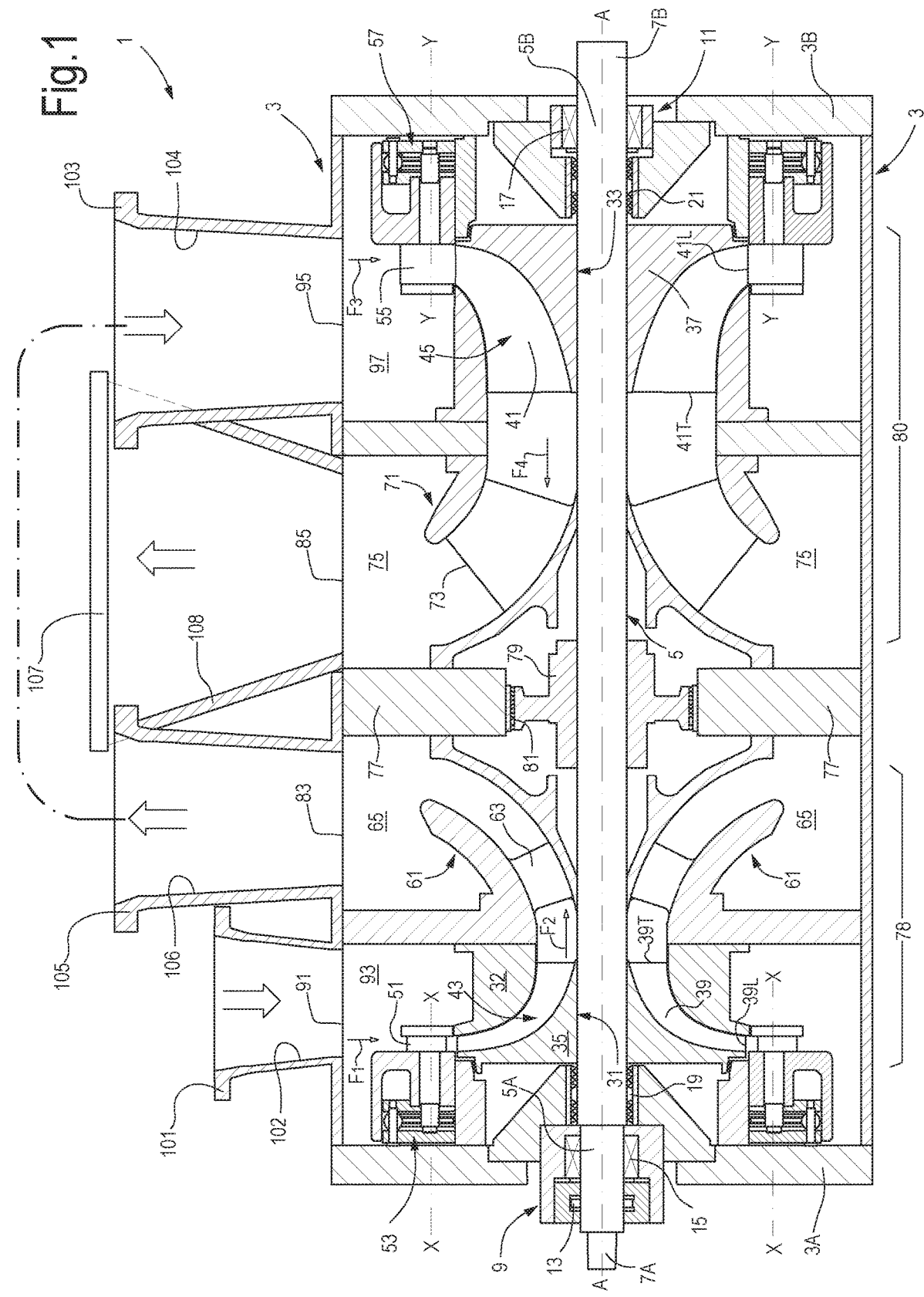
FIG. 1 illustrates a sectional view of an embodiment of a multi-stage turboexpander according to the present disclosure.

To provide a simpler, less expensive, though efficient turboexpander, according to embodiments disclosed herein the turboexpander comprises a casing and a shaft mounted for rotation therein. The shaft can be rotatingly supported by bearings at both ends thereof. The bearings do not require to be mounted precisely at the ends of the shaft, but rather at end portions thereof, it being understood that one or both shaft end portions can project outboard of the bearings, for instance they can project from the casing or can be accessible from the exterior of the casing. A load can thus be drivingly coupled to one or both ends of the shaft. Additionally, in embodiments disclosed herein, at least two radial impellers are mounted on the shaft to rotate integrally therewith in the casing. Working fluid can flow through a first stage of the turboexpander, which includes one of the radial impellers. Partly expanded working fluid can be removed from the casing to be subjected to a thermodynamic action, for instance to be re-heated, prior to be delivered to a second stage of the turboexpander, which includes the second radial impeller.

The resulting multi-stage turboexpander is more compact and less complex than an integrally geared turboexpander.

As used herein, the term "radial impeller" may be understood as an impeller wherein impeller blades define flow channels extending at least for a part thereof in a radial direction, i.e. in a direction approximately orthogonal to the rotation axis of the shaft, rather than parallel to the shaft. The term "radial impeller" thus encompasses also those impellers, wherein the working fluid flows at least partly in an axial direction, i.e. substantially parallel to the rotation axis, for instance impellers wherein the inlet direction of the working fluid is substantially radial and the discharge direction of the working fluid is substantially axial.

The speed of the working fluid expanding in a turboexpander generally has a tangential speed component. Thus, as understood herein, a radial direction of flow and an axial direction of flow generally also have a tangential speed component.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When introducing elements of various embodiments the articles "a", "an", "the", and "said" are intended to mean that there are one or more of the elements. The terms "comprising", "including", and "having" are intended to be inclusive and mean that there may be additional elements other than the listed elements.

Referring now to the drawings, in some embodiments, a turboexpander 1 includes a casing 3 having a first axial end 3A and a second axial end 3B. "Axial" understood herein may refer to the direction defined by the rotation axis of the turboexpander shaft.

The casing 3 can be a vertically split casing or a horizontally split casing. A shaft 5 is supported for rotation in the casing 3. The shaft 5 has a rotation axis A-A, a first end portion 5A and a second end portion 5B. In some embodiments, the first end portion 5A can extend with a terminal shaft section 7A outside the casing 3, or can be accessible from outside the casing 3. In some embodiments, the second end portion 5B can extend with a terminal shaft section 7B outside the casing 3, or can be accessible from outside the casing 3.

The terminal shaft section 7A, or the terminal section 7B, or both can be adapted to be drivingly coupled to a load, not shown in FIG. 1, by means of a suitable joint, for instance a flexible joint. The load can be coupled to the shaft 5 without an intermediate gearbox or other speed manipulating device, such that the load can rotate at the substantially the same rotational speed as the shaft 5. Substantially the same rotational speed means that the load rotational speed and the shaft rotational speed are the same except for minor speed fluctuations due to torsional deformations of the shaft line, i.e. the shaft 5, the shaft of the load, and any intermediate coupling, such as a flexible joint or a clutch.

In the embodiment shown in FIG. 1, the shaft 5 is supported by a first bearing 9 and a second bearing 11. The first bearing 9 can be arranged at the first shaft end portion 5A and the second bearing 11 can be arranged at the second shaft end portion 5B. One or both bearings 9, 11 can actually include one or more bearing elements. As used herein, the term "beating" may thus be understood as any arrangement of one or more components, which have an axial bearing capacity, i.e. are adapted to support axial loads, a radial bearing capacity, i.e. are adapted to support radial loads, or a combined axial and radial bearing capacity.

In the embodiment of FIG. 1, the bearing 9 includes an axial bearing element or thrust bearing element 13 and a radial bearing element 15. The bearing 11 includes a radial bearing element 17. The bearings 9, 11 may include any kind of bearing elements suitable to operate under the required conditions. For instance, the bearings 9, 11 can include fluid bearings, such as hydrodynamic or hydrostatic bearings, or combined hydrostatic/hydrodynamic bearings. In some embodiments, the bearings 9, 11 can include rolling bearings. In other embodiments, the bearings 9, 11 can include magnetic bearings, such as active magnetic bearings. A combination of different bearings is also not excluded, for instance magnetic hearings and fluid bearings, or magnetic bearings and rolling bearings, or else rolling bearings and fluid bearings in combination.

Sealing arrangements 19, 21 can be arranged at one or both ends of the shaft 5. The sealing arrangements can be arranged outboard or, in an embodiment, inboard of the respective bearings 9 and 11. In the latter arrangement, as shown in FIG. 1, the sealing arrangements prevent or reduce working fluid leakages towards the environment and also protect the bearings 9, 11 from the working fluid. In some embodiments, the sealing arrangements 19, 21 can include dry-gas seals.

In some embodiments, the turboexpander 1 comprises a first radial impeller 31 and a second radial impeller 33. The shaft 5, the first radial impeller 31 and the second radial impeller 33 form part of a rotor of the turboexpander 1. The first radial impeller 31 and the second radial impeller 33 are mounted on the shaft 5 in an intermediate position between the bearings 9 and 11. The first radial impellers 31 and the second radial impellers 33 are thus mounted in a between-bearing configuration.

The first radial impeller 31 and the second radial impeller 33 can be shrouded (closed) or unshrouded (open), independently of one another. In the exemplary embodiment of FIG. 1 both the first radial impeller 31 and the second radial impeller 33 are unshrouded and co-act with respective stationary diaphragms 32 and 34 arranged in the casing 3.

The first radial impeller 31 and the second radial impeller 33 are centripetal impellers, i.e. radial inward impellers, through which the working fluid flows at least partly in a radial direction from an intake section to a discharge section, wherein the discharge section is nearer to the shaft rotation axis A-A and the intake section is more distanced from the shaft rotation axis A-A.

The first radial impeller 31 comprises a hub 35 and the second radial impeller 33 comprises a hub 37. The hub 35 has blades 39 and the hub 37 has blades 41. The blades 39 and 41 project from a front surface of the respective hub 35 and 37. Each blade 39 extends from a leading edge 39L to a trailing edge 39T. Similarly, each blade 41 extends from a leading edge 41L, to a trailing edge 41T.

In some embodiments, the radial impellers 31 and 33 are arranged in a so-called back-to-back or in a front-to-front configuration. As used herein, a back-to-back configuration may be understood as a configuration wherein the bladed front surfaces of the impeller hubs are facing in opposite directions, i.e. away from one another. As understood herein, a front-to-front configuration may be understood as a configuration wherein the bladed front surfaces of the impeller hubs are facing each other. In the embodiment of FIG. 1, the radial impellers 31 and 33 are arranged in a front-to-front configuration. This may result in improved accessibility to various instrumentalities of the turboexpander. Both back-to-back as well as front-to-front configurations may further be beneficial in terms of axial load balancing.

In other embodiments, not shown, the radial impellers may be arranged in an in-line configuration, namely with the front, bladed surface of one impeller facing the back surface of the other impeller.

Each pair of adjacent blades 39 define a flow channel 43 of the first radial impeller 31, extending from an inlet side at the leading edges 39L to a discharge side at the trailing edges 39T. Each pair of adjacent blades 41 define a flow channel 45 of the second radial impeller 31, extending from an inlet side at the leading edges 41L to a discharge side at the trailing edges 41T.

The inlet sides of both radial impellers 31, 33 are arranged at a distance from the rotation axis A-A of the shaft 5, which is larger than the distance of the discharge sides. In the embodiment of FIG. 1 the direction of the flow channels 43, 45 is initially radial. In the most down-stream portion thereof, i.e. near the discharge sides, each flow channel 43, 45 bends in an approximately axial direction. Thus, the flow of the working fluid moves from the inlet sides to the discharge sides of the respective flow channels 43, 45 in a radial inward direction, i.e. in a centripetal direction, in the first part of the flow channels and thereafter in a substantially axial direction. As noted above, the actual speed of the flow has generally a tangential component oriented in the tangential direction as well, as the working fluid moves with the impellers 31, 33 and thus also rotates around the axis A-A.

Arrows F1 and F2 schematically represent the radial and axial speed components of the working fluid flow at the inlet side and discharge side, respectively, of the first impeller 31. Arrows F3 and F4 schematically represent the radial speed and axial speed components of the working fluid at the inlet side and discharge side, respectively, of the second impeller 33.

In some embodiments, a first set of movable or variable nozzle guide vanes 51 are annularly arranged around the first radial impeller 31, at the inlet side thereof. Each variable nozzle guide vane 51 is pivotally movable around a respective pivoting axis X-X, which can be parallel to the rotation axis A-A of the shaft 5. The pivoting movement of the variable nozzle guide vanes 51 can be controlled by actuation devices 53 known in the art, which can be configured to control the variable inclination of all nozzle guide vanes 51 simultaneously.

Similarly, in some embodiments, a second set of movable or variable nozzle guide vanes 55 are annularly arranged around the second radial impeller 33, at the inlet side thereof. Each variable nozzle guide vane 55 is pivotally movable around a respective pivoting axis Y-Y, which can be parallel to the rotation axis A-A of the shaft 5. The pivoting movement of the variable nozzle guide vanes 55 can be controlled by actuation devices 57 similar to devices 53.

In other embodiments, the nozzle guide vanes 51, or the nozzle guide vanes 55, or both can be stationary, i.e. may have a fixed rather than a variable geometry.

FIG. 1 shows a first diffuser 61 arranged downstream of the discharge side of the first radial impeller 31. The first diffuser 61 can be coaxial to the shaft 5 in a stationary position inside the casing 3. The first diffuser 61 can be a bladed diffuser, including stationary blades 63 arranged in an annular flow path extending from an inlet end to a discharge end of the first diffuser 61. The first diffuser 61 can develop in a radially outwardly oriented direction, such that the flow of working fluid flowing there through will have a radial speed component at the discharge end of the first diffuser 61. The first diffuser 61 is thus configured to deviate an axial flow at the inlet thereof into a radial or mixed axial-radial flow at the outlet thereof. A mixed axial-radial flow may be understood as a flow which has an axial speed component and a radial speed component. The first diffuser 61 can lead in a first discharge plenum 65 located in the casing 3.

FIG. 1 further shows a second diffuser 71 arranged downstream of the discharge side of the second radial impeller 33. The second diffuser 71 can be mounted coaxially to the shaft 5 in a stationary position inside the casing 3. The second diffuser 71 can be a bladed diffuser, including stationary blades 73 arranged in an annular flow path extending from an inlet end to a discharge end of the second diffuser 71. The second diffuser 71 can develop in a radially outwardly oriented direction, such that the flow of working fluid flowing there through will have a radial speed component at the discharge end of the diffuser. Similarly to the first diffuser 61, the second diffuser 71 can thus be configured to deviate an axial flow at the inlet thereof into a radial or mixed axial-radial flow at the outlet thereof. The second diffuser 71 can lead in a second discharge plenum 75 located in the casing 3.

The first radial impeller 31, the respective stationary diaphragm 32, the first diffuser 61 and the first discharge plenum 65 form part of a first turboexpander stage 78. The second radial impeller 33, the respective stationary diaphragm 34, the second diffuser 71 and the second discharge plenum 75 form part of a second turboexpander stage 80.

The first discharge plenum 65 and the second discharge plenum 75 can be separated from one another by a partition wall 77 and by a disk 79 mounted on shaft 5 and rotating therewith. A sealing arrangement 81 can be included between the partition wall 77 and the disk 79, such that leakages from the first discharge plenum 65 towards the second discharge plenum 75 can be reduced or prevented.

The first discharge plenum 65 can be fluidly coupled to a first discharge port 83. The second discharge plenum 75 can be fluidly coupled to a second discharge port 85.

Working fluid can be delivered to the first turboexpander stage 78 through a first intake port 91, which is fluidly coupled to a first inlet plenum 93. Working fluid can be delivered to the second turboexpander stage 80 through a second intake port 95, which is fluidly coupled to a second inlet plenum 97.

A first intake flange 101 and a first intake nozzle 102 are shown in FIG. 1, through which working fluid is delivered to the first turboexpander stage 78. A second intake flange 103 and a second intake nozzle 104 are further shown in FIG. 1, to deliver working fluid to the second turboexpander stage 80.

A first discharge flange 105 and a first discharge nozzle 106 are fluidly coupled to the first discharge plenum 65 to discharge working fluid from the first turboexpander stage 78. A second discharge flange 107 and a second discharge nozzle 108 are fluidly coupled to the second discharge plenum 75 to discharge working fluid from the second turboexpander stage 80.

Figure 2:
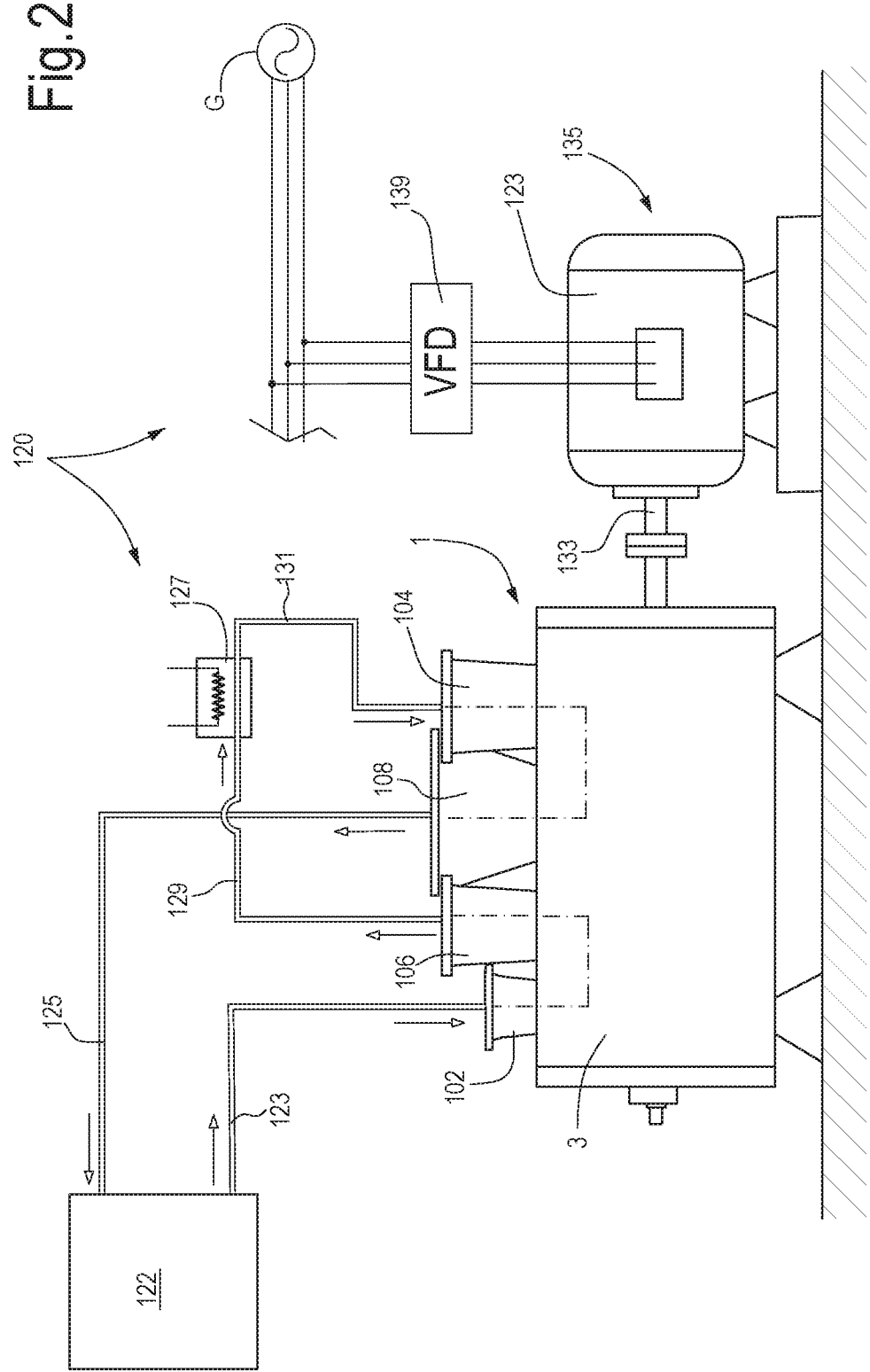
FIG. 2 illustrates a schematic of a system including the multi-stage turboexpander of FIG. 1.

The operation of the turboexpander 1 described so far will be illustrated in more detail here on, reference being made to FIG. 2, with continuing reference to FIG. 1.

FIG. 2 illustrates an exemplary system 120, which can include one or more turboexpanders 1. The system 120 can include a process facility 122, wherefrom compressed and hot working fluid can be delivered through a first delivery duct 123 to the turboexpander 1. The first delivery duct 123 can be fluidly coupled to the first intake nozzle 102 of the turboexpander 1. A return duct 125 returns exhausted working fluid from the turboexpander 1 to the process facility 122. The return duct can be fluidly coupled to the second discharge nozzle 108 of the turboexpander 1.

An intermediate process facility 127 can be fluidly coupled through an intermediate return duct 129 to the first discharge nozzle 106 of the turboexpander 1. An intermediate delivery duct 131 can fluidly couple the intermediate process facility 127 to the second intake nozzle 104 of the turboexpander 1.

The process facility 122 can be any process facility wherein the working fluid can be subjected to thermodynamic transformations, for instance. The intermediate process facility 127 can further be any process facility where the working fluid undergoes further thermodynamic transformations or other thermodynamic actions. For instance, the process facility 122 can include a compressing facility and a heater, to compress the working fluid using available mechanical power and heat the compressed working fluid using heat from an available heat source. The intermediate process facility 127 can include a re-heater, where the working fluid is re-heated. The intermediate process facility 127 and the process facility 122 can be part of the same plant or system. For instance, they may be part of a CAES system.

In the exemplary embodiment of FIG. 2, the turboexpander 1 is drivingly coupled through a shaft line 133 to a load 135, which can include an electrical generator, for instance. The electrical generator can be electrically coupled to an electric energy distribution grid G, for instance through a variable frequency drive 139.

The system 120 operates as follows. Hot and compressed working fluid is delivered from the process facility 122 to the first turboexpander stage 78, where the working fluid is partly expanded, producing mechanical power, which is available on the shaft 5 and can be used to drive the load 135. Partly expanded working fluid is discharged from the first turboexpander stage 78 through the first discharge port 83 and the first discharge nozzle 106 and is returned through intermediate discharge duct 129 to the intermediate process facility 127. The partly expanded working fluid can be re-heated or subjected to other thermodynamic actions in the intermediate process facility 127, prior to be delivered again through the intermediate delivery duct 131 to the second turboexpander stage 80, where the working fluid expands further. The further expansion generates additional mechanical power, which is again available on shaft 5 and can be used to drive the load 135. Exhausted working fluid from the second turboexpander stage 80 is returned through the return duct 125 to the process facility 122.

Figure 3:
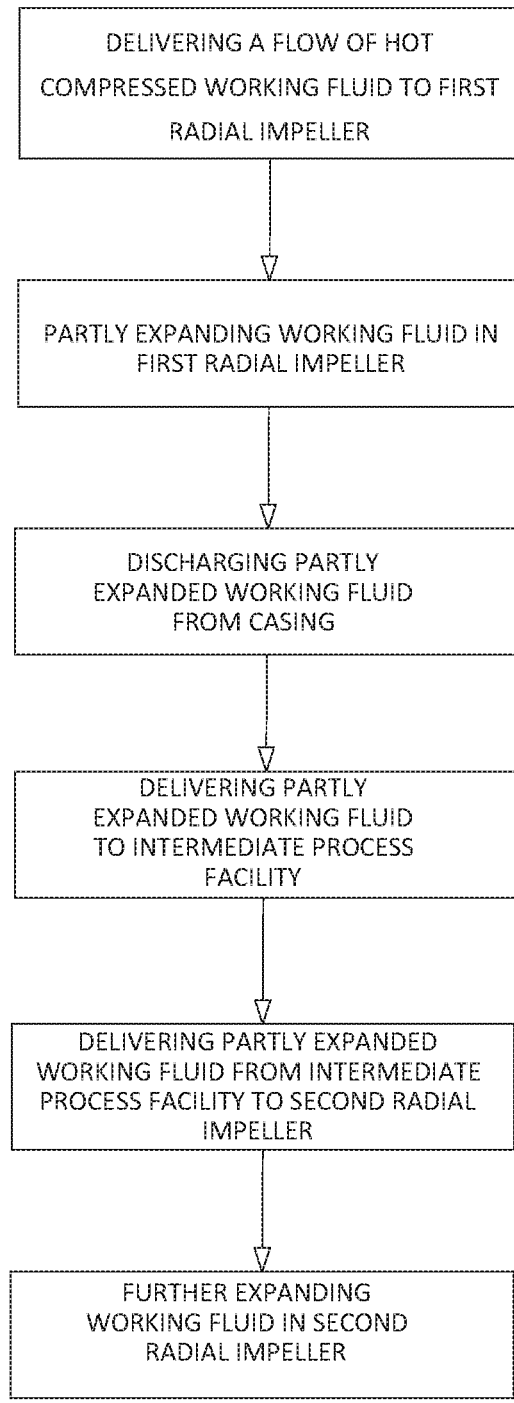
FIG. 3 illustrates a flow chart summarizing a method of generating power with a turboexpander of the present disclosure.

FIG. 3 shows a flowchart which summarizes the method of operating the turboexpander for generating mechanical power.

While in FIG. 2 a single turboexpander 1 is shown in combination with a single load 135, more than one load can be drivingly coupled to one or more turboexpanders 1. In other embodiments, more than one turboexpander can be drivingly coupled to one load.

While inventive features and benefits of embodiments of the invention have been described in terms of various specific embodiments, it will be apparent to those of ordinary skill in the art that many modifications, changes, and omissions are possible without departing form the spirt and scope of the appended claims. In addition, unless specified otherwise herein, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A multi-stage turboexpander, comprising:
a casing and a shaft arranged for rotation in the casing and supported by at least a first bearing at a first shaft end portion and a second bearing at a second shaft end portion;
at least a first radial impeller and a second radial impeller arranged between the first bearing and the second bearing on the shaft for co-rotation therewith around a rotation axis;
a first inlet plenum in the casing to provide pressurized working fluid to the first radial impeller via a first inlet port of the casing;
a first discharge plenum in the casing to provide partly expanded working fluid to a first discharge port of the casing to expel the partly expanded working fluid from the casing;
a second inlet plenum in the casing to provide partly expanded working fluid to the second radial impeller via a second inlet port of the casing;
a second discharge plenum in the casing to provide a flow of exhaust working fluid to a second discharge port of the casing to expel the exhaust working fluid from the casing;
a partition wall within the casing between the first discharge plenum and the second discharge plenum to separate said discharge plenums, the partition wall defining an opening to receive the shaft therethrough;
a disk mounted on the shaft and received in the opening in the partition wall such that clearance space is provided between the disk and the partition wall to enable the disk to rotate with the shaft; and a sealing arrangement between the first discharge plenum and the second discharge plenum to seal the clearance space to reduce or prevent leakage form the first discharge plenum toward the second discharge plenum.

2. The multi-stage turboexpander of claim 1, wherein each first radial impeller and second radial impeller are adapted for a radial inward flow of working fluid.

3. The multi-stage turboexpander of claim 2, wherein the first radial impeller and the second radial impeller are each provided with an impeller hub having a plurality of impeller blades extending from a respective leading edge to a respective trailing edge and defining a respective flow channel between each set of two adjacent impeller blades of the plurality of impeller blades, wherein the respective flow channel has a respective flow inlet arranged at a first distance from the rotation axis and a respective flow outlet arranged at a second distance from the rotation axis, the first distance greater than the second distance.

4. The multi-stage turboexpander of claim 3, wherein the flow inlet of the first radial impeller and the flow inlet of the second radial impeller are oriented in a radial direction.

5. The multi-stage turboexpander of claim 3, wherein the flow outlet of the first radial impeller and the flow outlet of the second radial impeller are oriented in an axial direction.

6. The multi-stage turboexpander of claim 1, wherein at least one of the first radial impeller and second radial impeller has variable nozzle guide vanes.

7. The multi-stage turboexpander of claim 6, wherein both the first radial impeller and the second radial impeller have variable nozzle guide vanes.

8. The multi-stage turboexpander of claim 1, wherein at least one diffuser is arranged downstream of at least one of the first radial impeller and the second radial impeller.

9. The multi-stage turboexpander of claim 8, wherein stationary blades are arranged in at least one of the at least one diffuser.

10. The multi-stage turboexpander of claim 9, wherein each of the at least one diffuser is configured to deviate an axial flow exiting the respective radial impeller in a mixed axial-radial flow or in a radial flow.

11. The multi-stage turboexpander of claim 1, wherein the first radial impeller and the second radial impeller are arranged in a back-to-back or front-to-front position with respect to one another.

* * * * *